United States Patent [19]
Ding et al.

[11] Patent Number: 5,963,544
[45] Date of Patent: Oct. 5, 1999

[54] METHOD FOR MINIMIZING STREET CROSSINGS AND MEETING MAXIMUM CAPACITY CONSTRAINTS IN A NETWORK DESIGN

[75] Inventors: Yuemin Ding, Armonk, N.Y.; Paul J. Densham, Wembley, United Kingdom

[73] Assignee: NYNEX Science & Technology, Inc., White Plains, N.Y.

[21] Appl. No.: 08/869,410

[22] Filed: Jun. 5, 1997

[51] Int. Cl.[6] .................................. H04J 1/16; H04J 3/14; H04J 1/00; H04J 12/26
[52] U.S. Cl. ....................... 370/238; 370/254; 395/200.72
[58] Field of Search ..................... 370/229, 230, 370/232, 235, 238, 257, 254; 395/200.69, 200.7, 200.71, 200.72, 200.68

[56] References Cited

U.S. PATENT DOCUMENTS

| | | | |
|---|---|---|---|
| 5,079,760 | 1/1992 | Nemirovsky et al. | 370/238 |
| 5,291,477 | 3/1994 | Liew | 370/238 |
| 5,317,566 | 5/1994 | Joshi | 370/238 |
| 5,608,721 | 3/1997 | Natarajan et al. | 370/238 |

OTHER PUBLICATIONS

An article by P.J. Densham and G. Rushton, entitled Providing Spatial Decision Support For Rural Public Service Facilities That Require A Minimum Workload (in press)(1996).

An article by P.J. Densham and G. Rushton, entitled A More Efficient Heuristic For Solving Large P–median Problems, Papers in Regional Science 71, 3:307–29 (1992).

An article by M.F. Goodchild and V.T. Noronha, entitled Location–Allocation For Small Computers, Monograph 8, Dept. of Geography, the University of Iowa (1983).

An article by E.L. Hillsman, entitled Heuristic Solutions To Location–Allocation Problems, Monograph 7, Dept. of Geography, The University of Iowa (1980).

An article by R.L. Church and C.S. Revelle, entitled The Maximal Covering Location Problem, Papers of the Regional Science Association, 32: 101–118 (1974).

An article by M.B. Teitz and P. Bart, entitled Heuristic Methods For Estimating The Generalized Vertex Median of a Weighted Graph, Operation Research 16:955–61 (1968).

An article by E.W. Dijkstra, entitled A Note On Two Problems in Connection With Graphs, Numererische Mathematik, vol. 1, pp. 269–271 (1959).

*Primary Examiner*—Ajit Patel
*Assistant Examiner*—Bob A. Phunkulh
*Attorney, Agent, or Firm*—Ohlandt, Greeley, Ruggiero & Perle

[57] ABSTRACT

A method for designing a telecom network includes retrieving data corresponding to a plurality of network node locations, a plurality of subscriber locations and other relevant information such as associated street blocks and distance values. Each network node location and subscriber location combination having a distance value therebetween greater than a maximum distance is initially eliminated. Thereafter, each network node location and subscriber location combination is assigned a priority value, based on constraints such as the proximity between their associated street blocks and/or the maximum capacity of each network node location. The total sum of priority values and total number of subscriber locations are then calculated for those sets of network node locations and corresponding subscriber locations that are selected by the algorithm. A final set of network node locations and assigned subscriber locations is identified by determining the set having the lowest total sum of priority values, which minimizes the street crossings in the design, and the highest number of subscriber locations.

14 Claims, 9 Drawing Sheets

NETWORK NODE DATABASE ~24

| NETWORK NODE LOCATION IDENTIFICATION (ID) NUMBER | POSITIONAL DATA | STREET BLOCK |
|---|---|---|
|  |  |  |
|  |  |  |
|  |  |  |

FIG. 2

SUBSCRIBER DATABASE ~26

| SUBSCRIBER LOCATION IDENTIFICATION (ID) NUMBER | POSITIONAL DATA | STREET BLOCK |
|---|---|---|
|  |  |  |
|  |  |  |
|  |  |  |

FIG. 3

NETWORK NODE LIST ~30

| NETWORK NODE LOCATION ID NUMBER | NUMBER OF SUBSCRIBER LOCATIONS | SUBSCRIBER LOCATION ID NUMBER | DISTANCE | PRIORITY VALUE (PV) |
|---|---|---|---|---|
| | | | | |
| | | | | |
| | | | | |
| | | | | |
| | | | | |
| | | | | |
| | | | | |

FIG. 4

SUBSCRIBER LIST ~28

| SUBSCRIBER LOCATION ID NUMBER | NUMBER OF NETWORK NODE LOCATIONS | NETWORK NODE LOCATION ID NUMBER | DISTANCE | PRIORITY VALUE (PV) |
|---|---|---|---|---|
| | | | | |
| | | | | |
| | | | | |
| | | | | |
| | | | | |
| | | | | |
| | | | | |

FIG. 5

METHOD FOR MINIMIZING STREET CROSSINGS AND MEETING MAXIMUM CAPACITY CONSTRAINTS IN A NETWORK DESIGN

FIELD OF THE INVENTION

The present invention relates to a method for designing a telecommunication network and, more particularly, to a method for designing a network that has a minimum number of street crossings and meets maximum capacity constraints for the network nodes.

BACKGROUND OF THE INVENTION

In constructing a telecom network, a designer is faced with the task of selecting network node locations (i.e., facilities, network nodes, cabinets . . . etc.) that serve as many subscriber locations (i.e., homes) as possible, while minimizing the construction and installation costs and maintaining the quality of the transmitted signals. This problem is derived from those commonly referred to as the "p-median location-allocation problem" or the "maximal covering location-allocation problem." In general, the p-median problem is to select p network nodes from among m candidate locations to serve n demand locations, in such a way that the aggregate service distance/time/cost for the n demand locations is minimized. The maximum covering problem, however, is to ensure that the number of demand locations served by the selected p network nodes is maximized.

Location-allocation problems are often solved with the use of heuristic algorithms, the most common type of which is the interchange algorithm. An interchange algorithm involves cycles of repetitive substitutions and comparisons to determine an optimum set of network node locations and corresponding subscriber locations. Examples of current interchange algorithms can be found in a paper authored by Teitz, M. B. and Bart, P., entitled "Heuristic methods for estimating the generalized vertex median of a weighted graph," Operations Research 16: 955–61 (1968), a paper authored by Goodchild, M. F. and Noronha, V. T., entitled "Location-allocation for small computers," Monograph 8, Dept. of Geography, the University of Iowa (1983) and a paper authored by Densham, P. J. and Rushton, G., entitled "A more efficient heuristic for solving large P-median problems," Papers in Regional Science 71, 3: 307–29 (1992).

Although current algorithms are capable of minimizing distances in a network design, they do not provide or suggest a method to account for maximum capacity limits of a network node location. That is to say, these interchange algorithms do not take into account the fact that each network node can only service a limited number of homes. This factor is particularly important in dense regions where there is greater demand (i.e., homes, subscriber premises, etc.). Network nodes selected to service such dense regions will experience a higher demand than other network nodes in the system. This results in unbalanced loads among the network nodes, and such loads often exceed the maximum capacity limit of a real-world network node.

For instance, in the location of CATV cabinets and allocation of homes to such cabinets, each cabinet has a maximum capacity limit, typically sixty-four homes per cabinet (i.e., a limited number of ports to connect to homes). Exceeding the maximum capacity limit requires additional equipment and, thus, results in a non-cost-effective CATV system.

Another approach to the workload problem of facilities is disclosed in a paper authored by Densham, P. J., and Rushton, G., entitled "Providing spatial decision support for rural public service facilities that require a minimum workload" (1996). This approach provides an improved algorithm which is utilized after running a p-median algorithm (as described above) and which adjusts the work load of each network node by reassigning demand among the network nodes in order to meet a required minimum workload for all network nodes. Although such a method can be extended to solve maximum capacity limit problems, this post-processing adjustment is limited by the selected locations of network nodes that do not account for the capacity constraints, and sometimes is not able to redistribute exceeded workloads among the selected network nodes due to full capacity.

Current approaches also do not suggest or provide a method for minimizing street crossings (i.e., minimizing the number of street crossings between a network node location and a corresponding subscriber location over the entire network). In constructing a network, each street crossing increases the overall cost of the network system. The problem appears when cables must be laid under the streets which require additional equipment and labor.

Accordingly, it is an object of the invention to provide a method for designing a telecom network with a minimum number of street crossings.

It is a further object of the invention to provide a method for designing a telecom network that meets the maximum capacity constraints on the network nodes.

Another object of the invention is to provide an easy method for incorporating a variety of constraints in the design of an optimum telecom network.

SUMMARY OF THE INVENTION

A method for designing a telecom network includes retrieving data corresponding to a plurality of network node locations, a plurality of subscriber locations and other relevant information such as associated street blocks and distance values. Each network node location and subscriber location combination having a distance value therebetween greater than a maximum distance is initially eliminated. Thereafter, each network node location and subscriber location combination is assigned a priority value, based on constraints such as the proximity between their associated street blocks and/or the maximum capacity of each network node location. The total sum of priority values and total number of subscriber locations are then calculated for those sets of network node locations and corresponding subscriber locations that are selected by the algorithm. A final set of network node locations and assigned subscriber locations is identified by determining the set having the lowest total sum of priority values, which minimizes the street crossings in the design, and the highest number of subscriber locations.

BRIEF DESCRIPTION OF THE DRAWINGS

FIG. 2 is a schematic diagram of a network node database maintained in the network design system of FIG. 1.

FIG. 3 is a schematic diagram of a subscriber database maintained in the network design system of FIG. 1.

FIG. 4 is a schematic diagram of a network node list maintained in the network design system of FIG. 1.

FIG. 5 is a schematic diagram of a subscriber list maintained in the network design system of FIG. 1.

DETAILED DESCRIPTION OF THE INVENTION

Before proceeding with a detailed description of a preferred embodiment of the present invention, it is well to define certain terms used herein. The term "maximum capacity value" will be used to refer to a maximum number of subscriber locations that may be serviced by a single network node location. The maximum capacity value reflects the reality that electronic equipment at each network node location has a limited number of ports that can be used to connect to subscriber locations.

The term "maximum distance value" will be used hereinafter to refer to an ideal maximum allowable distance between a subscriber location and a corresponding network node location. For example, this might reflect the maximum length of cable that can be used before signal degradation becomes unacceptable.

The term "street block" will be used hereinafter to refer to a region, in a village, town, city, . . . etc., that has one or more of its faces bounded by streets. Each street block may have situated thereon a plurality of subscriber locations (i.e., homes, buildings, . . . etc.) and possible network node locations (i.e., cabinets, . . . etc.).

The term "network node location and subscriber location combination" will refer to a network node location and a subscriber location that is assigned to the network node location (or vice-versa). Each network node location and subscriber location combination has an associated distance value and priority value.

The present invention is directed to a method for designing a telecom network having an optimum set of network node locations and serviced subscriber locations, based on real-life constraints such as a maximum distance, a certain number of subscriber locations, a given number of possible node locations, a maximum capacity constraint for each network node location, or a combination thereof.

Initially, the method involves retrieving data corresponding to each possible network node location and each subscriber location and their associated positional information. A distance value is calculated between each network node location and subscriber location along the street network (i.e., the distance between a network node location and subscriber location combination). Two lists are then generated which contain only those network node location and subscriber location combinations that have a distance value less than or equal to a maximum distance limit.

The generated lists are then updated to reflect additional real world constraints. Specifically, each network node location and subscriber location combination is assigned a priority value, i.e., a weighted value, based on determined constraints. With the updated information, repetitious cycles of comparisons between calculated sets of network node locations and serviced subscriber locations (i.e., an interchange algorithm) are performed to determine an optimum set, i.e., a set having the lowest total priority value and the highest number of subscriber locations.

Figure 1:
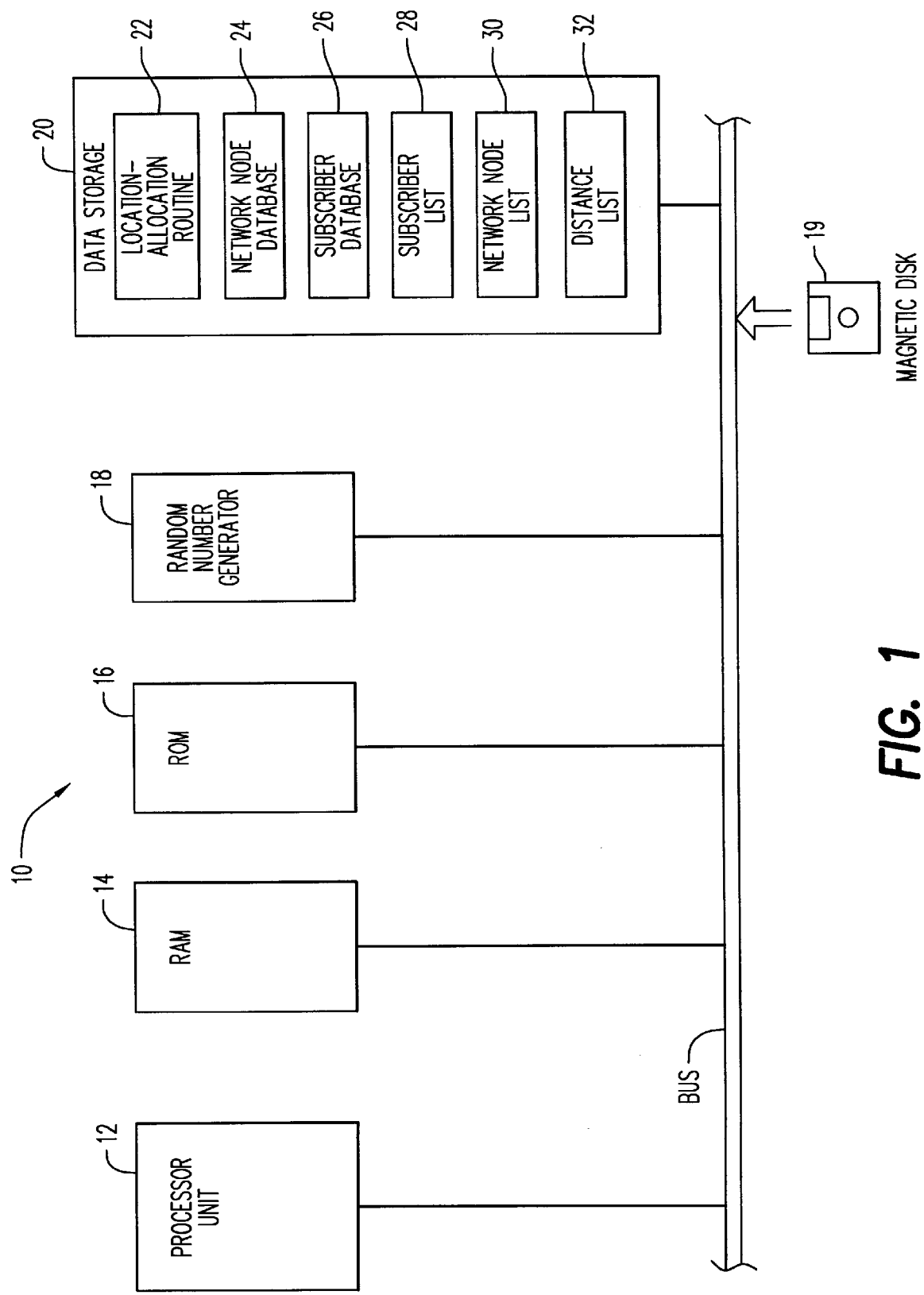
FIG. 1 is a block diagram of a network design system, in accordance with the present invention.

Referring to FIG. 1, a network design system 10 includes a location-allocation routine 22 which is stored in a data storage device 20 or which can be loaded thereinto via a magnetic disk 19. The location-allocation routine 22, in combination with the network design system hardware, retrieves data corresponding to each network node location and each subscriber location and determines an optimum set of network node locations and subscriber locations based on constraints such as a maximum capacity, a minimum number of street crossings, a maximum cable length, . . . etc.

Network design system 10 further includes a processor unit 12 which is coupled to a random access memory (RAM) 14, a read only memory (ROM) 16 and a random number generator 18. Data storage device 20 provides memory capacity for location-allocation routine 22, a network node database 24, a subscriber database 26, Subscriber List 28 and Network Node List 30.

A schematic depiction of the network node database 24 is found in FIG. 2 and preferably includes possible Network Node Location Identification (ID) Number, Positional data and Street Block. A possible Network Node Location ID Number identifies each possible location for placing network equipment (i.e., CATV cabinet). Positional Data indicates the coordinates of a possible network node location corresponding to a particular region (i.e., a neighborhood, town, city, . . . etc.). Street Block identifies the particular street block on which a network node location is situated.

Subscriber database 26 is illustrated, schematically, in FIG. 3 and includes a Subscriber Location Identification (ID) Number, Positional Data and Street Block. Subscriber Location ID Number identifies each subscriber location (i.e., homes, buildings, . . . etc.). Positional Data indicates the coordinates of a subscriber location associated with the particular region. Street Block indicates the street block containing the subscriber location.

FIG. 4 schematically illustrates a Network Node List 30 which is generated during the operation of the invention. Network Node List 30 is a modification of candidate data strings disclosed in a paper authored by Hillsman, E. L., entitled "Heuristic Solutions to Location-Allocation Problems." Monograph 7, Department of Geography, The University of Iowa, Iowa City, Iowa, in 1980. Network Node List 30 preferably includes Network Node Location ID Number, Number of Subscriber Locations, Subscriber Location ID Number, Distance and Priority Value. Network Node Location ID Number indicates a particular network node location. Number of Subscriber Locations indicates a number of subscriber locations that can be serviced by a particular network node location within a maximum distance. Subscriber Location ID Number indicates a particular subscriber location that can be served by the network node location within a maximum distance (i.e., a network node location and subscriber location combination). Distance Value is the distance between a network node location and a subscriber location in a particular network node location and a subscriber location combination. Priority Value indicates a weighted preference value of a network node location and subscriber location combination as compared to other combinations, based on pre-determined constraints such as a maximum capacity, number of street crossings, . . . etc.

As shown in FIG. 5, Subscriber List 28 is also generated during the operation of the invention. Subscriber List 28 is a modification of demand data strings disclosed in a paper authored by Goodchild, M. F. and Noronha, V., entitled "Location-Allocation for Small Computers." Monograph 8, Department of Geography, The University of Iowa, Iowa City, Iowa, in 1983. Subscriber List 28 preferably includes Subscriber Location ID Number, Number of Network Node Locations, Network Node Location ID Number, Distance and Priority Value. Number of Network Node Locations indicates the number of network node locations that are within a maximum distance limit from a particular subscriber location. Distance value is the distance between a network node location and subscriber location in a particular network node location and subscriber location combination. Priority Value indicates the preference of a network node location and subscriber location combination as compared to other combinations, based on pre-determined constraints such as a maximum capacity, . . . etc.

It is important to understand that Network Node List 30 and Subscriber List 28 are generated during the operation of the invention and updated to reflect desired constraints. Both lists 28, 30 contain the same network node location and subscriber location combinations and their associated distance values and priority values, except that Network Node List 30 is categorized by network node location and Subscriber List 28 is categorized by subscriber location. Although the generated information can be stored in one list, it is preferred that two lists 28 and 30 be utilized in order to facilitate the processing of the information.

Referring to FIGS. 7A through 7E, the operation of the invention will be described. Initially, there is a download to processor unit 12 of possible network node locations and subscriber locations from network node database 24 and subscriber database 26, a maximum capacity constraint, a maximum distance constraint between any network node location and any subscriber location, and any other constraints to be applied herein (Box 50).

Thereafter, processor unit 12 calculates a distance between each network node location and each subscriber location (Box 52). That is to say, a distance value (i.e., a distance string) is determined for each network node location and subscriber location combination. Except for those combinations that exceed the maximum distance constraint, each subscriber location and network node location combination and a corresponding distance value are then stored on Network Node List 30 and on a Subscriber List 28, in the order of increasing distances (i.e., lowest to highest) (Box 54). Note that any network node location and subscriber location combination exceeding the maximum distance value are eliminated as possible choices in the network design.

Instead of calculating each distance value during the operation of the invention, the distance value for each network node location and subscriber combination can be stored in a distance list 32 (FIG. 1) in increasing order, and retrieved as desired.

Figure 6:
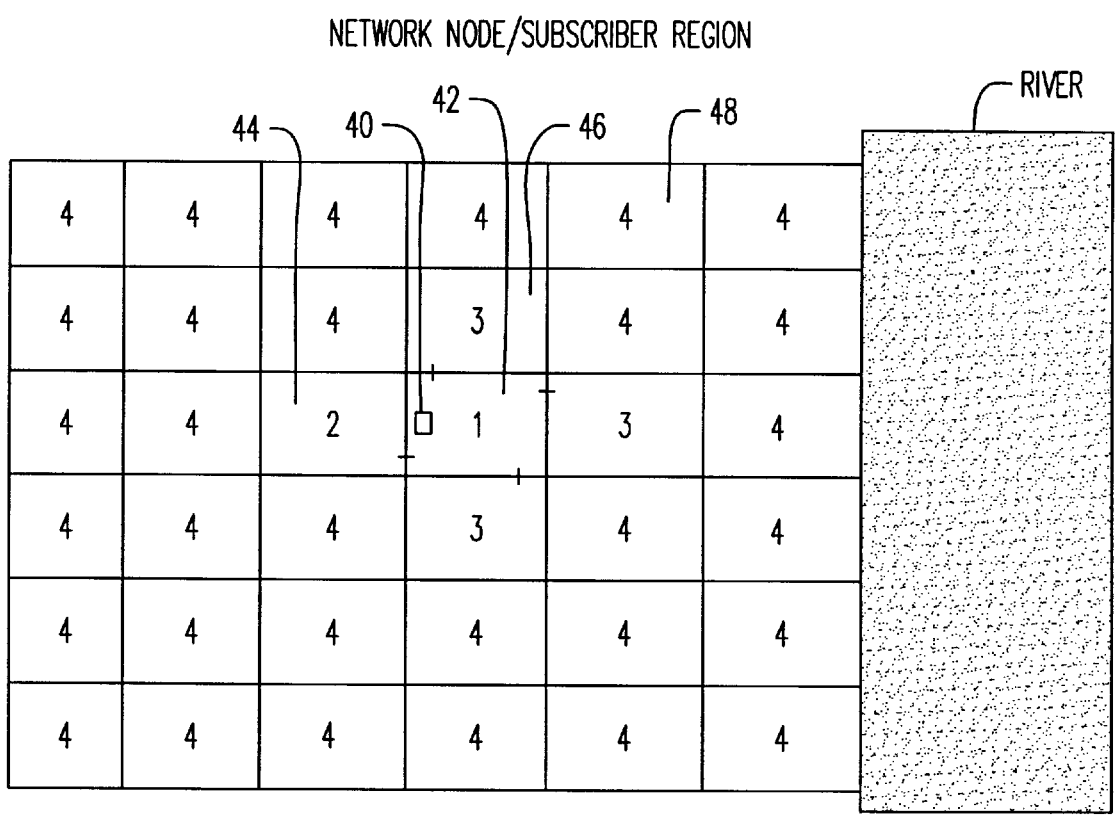
FIG. 6 illustrates a network region with each street block prioritized according to a selected network node location.
Figure 7A:
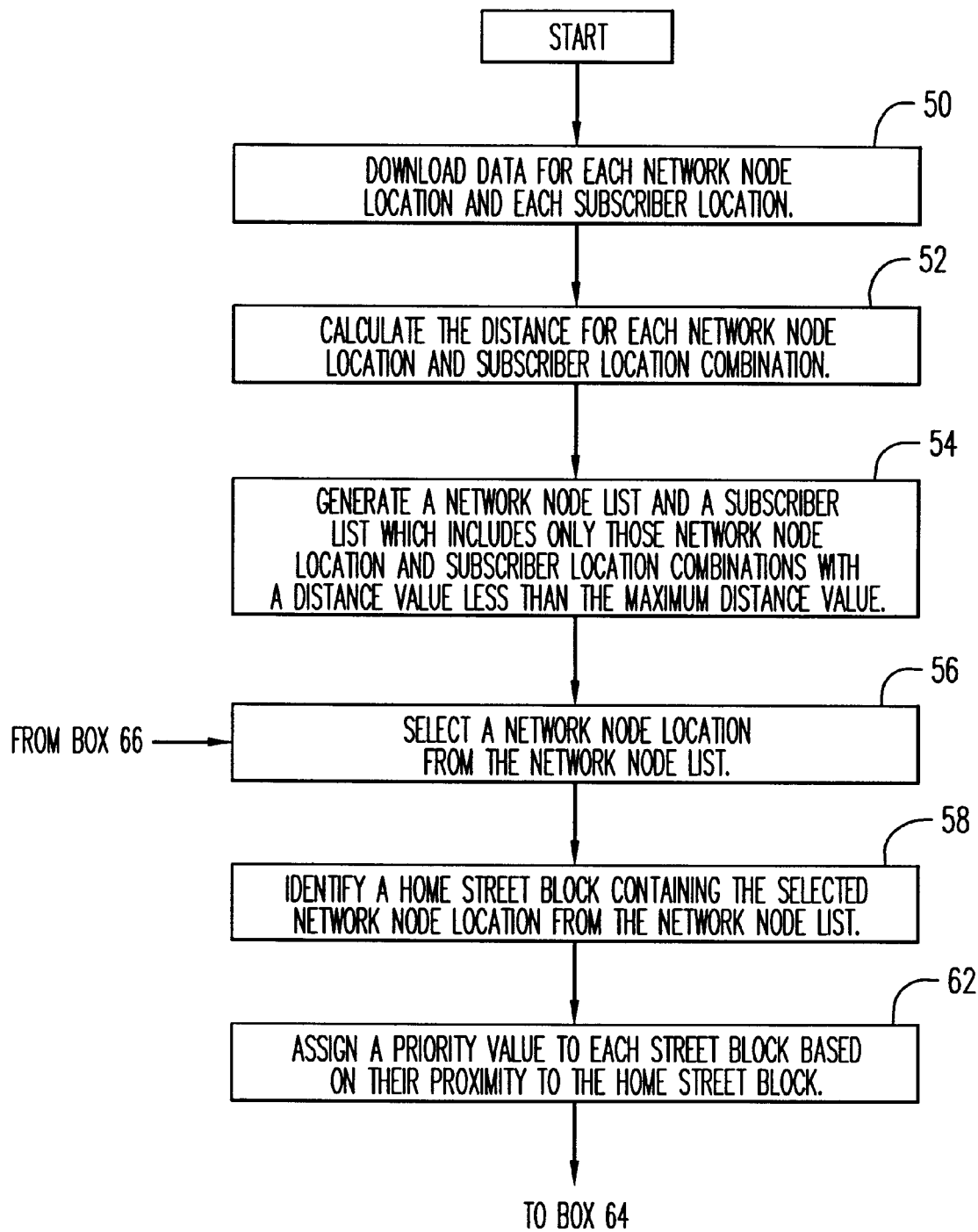
FIGS. 7A through 7E illustrate a logic flow diagram of the operation of the invention.
Figure 7B:
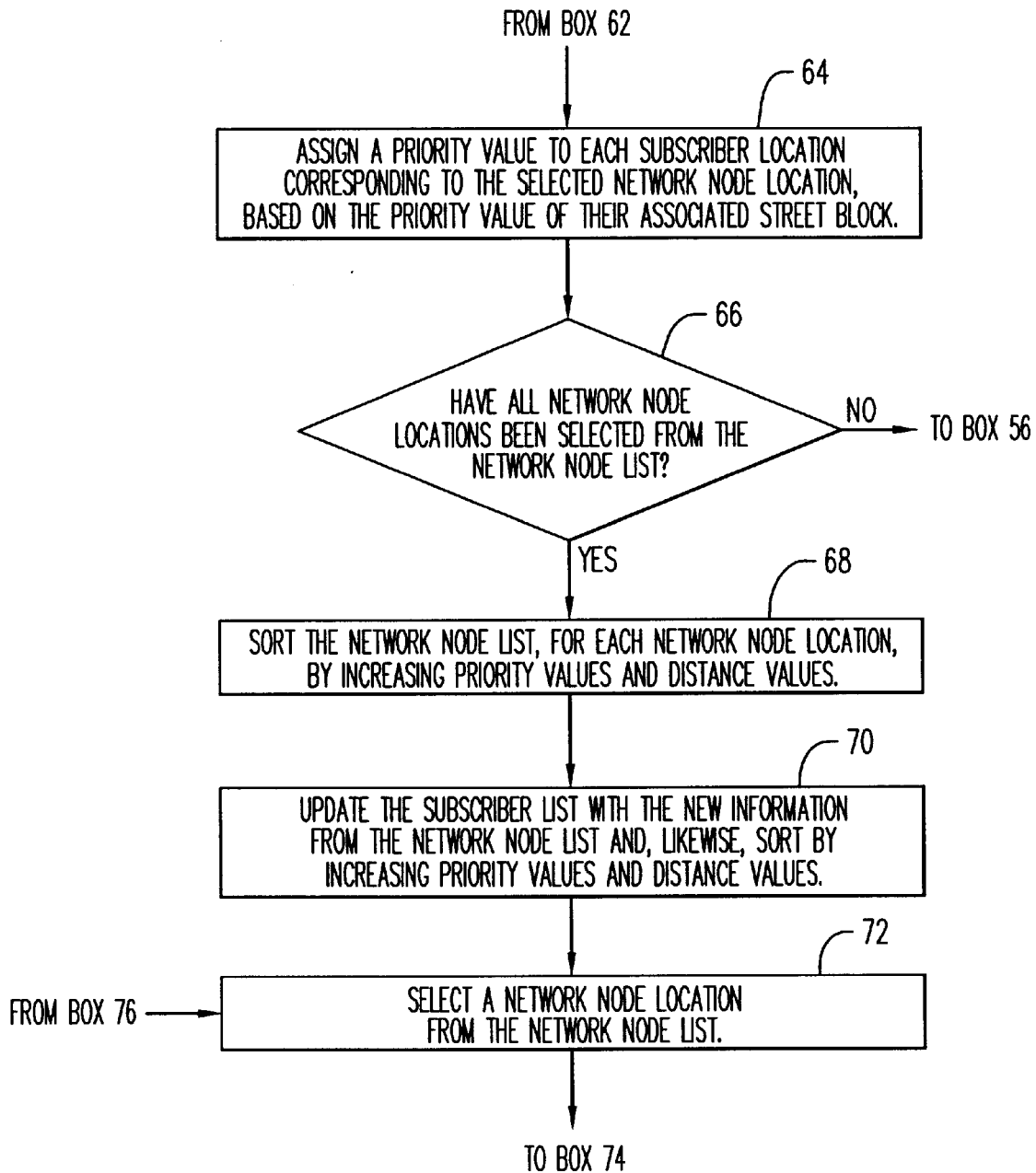
Figure 7C:
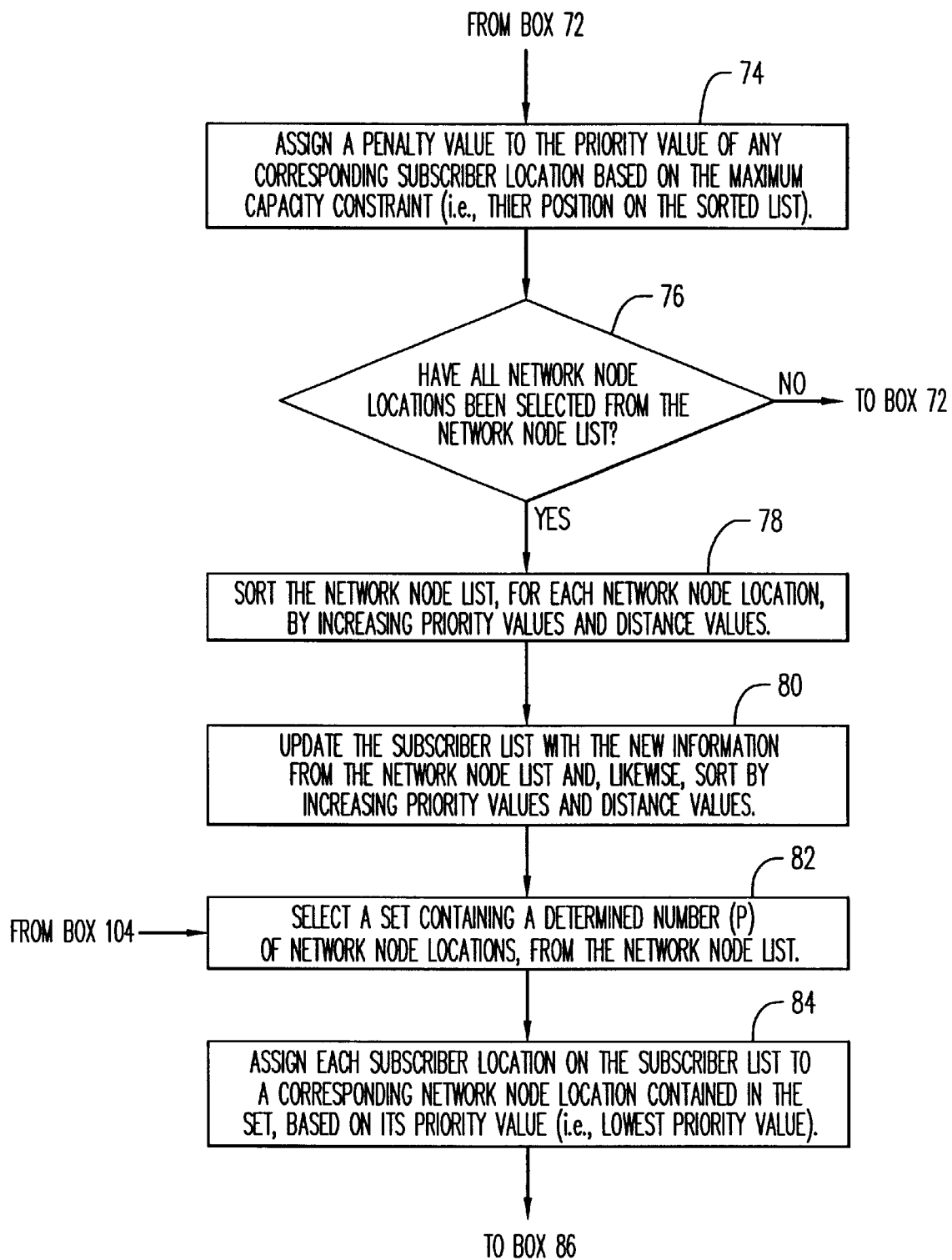
Figure 7D:
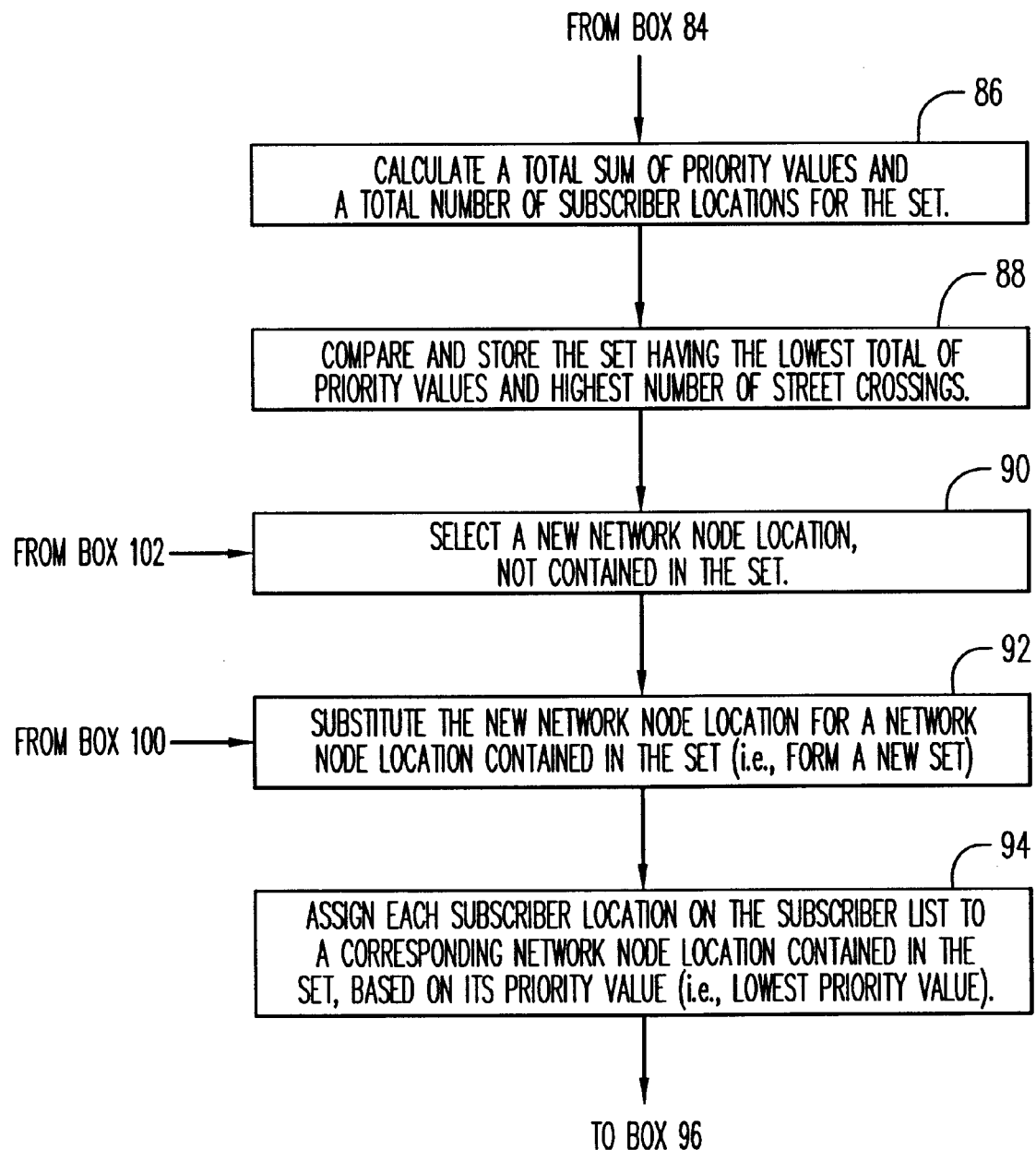
Figure 7E:
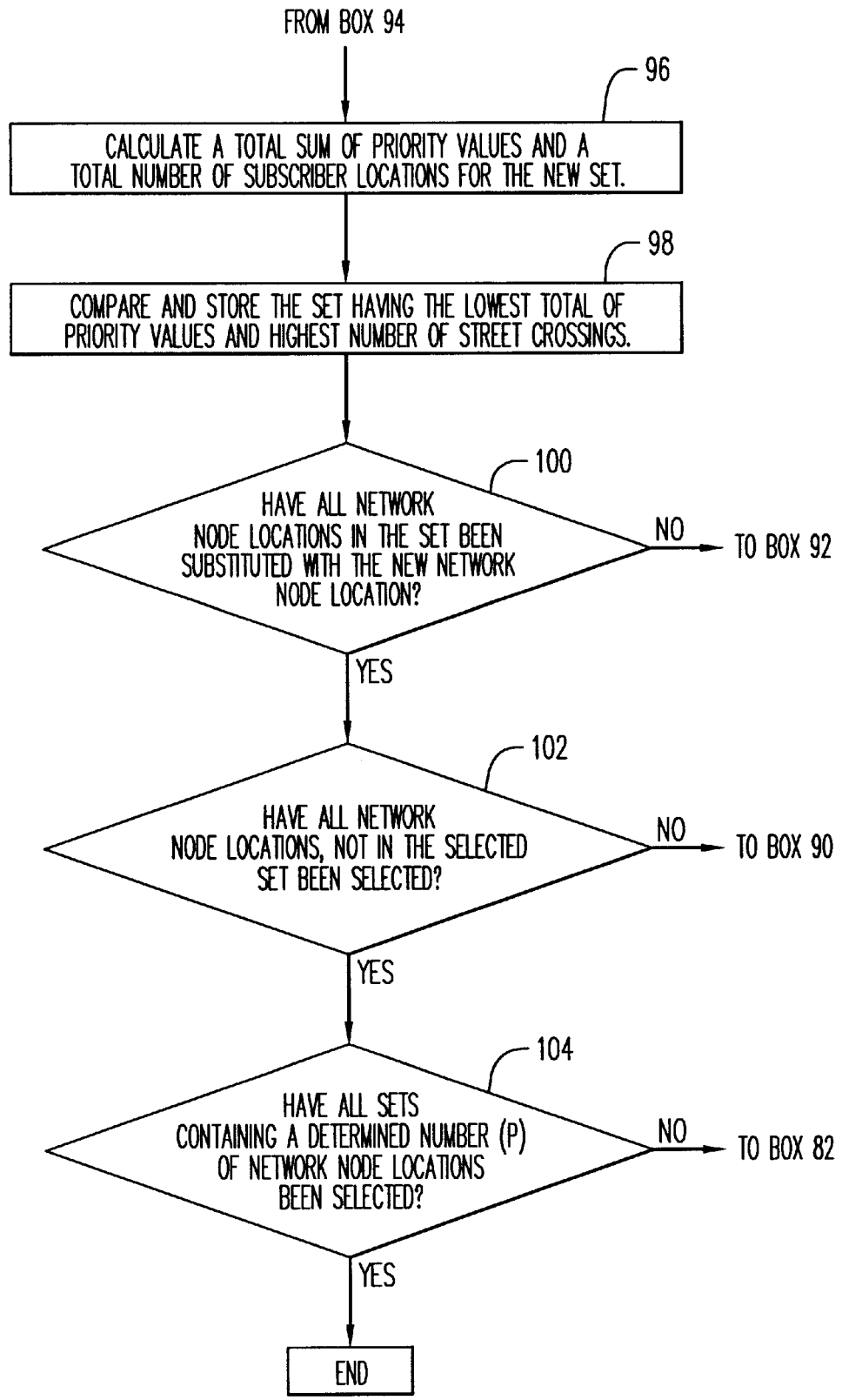

Referring to FIGS. 6, 7A and 7B, the next step is to update the information in Network Node List 30 and Subscriber List 28 with a street crossing constraint (hereinafter street crossing step). Processor unit 12 begins by accessing Network Node List 30 and selecting a network node location 40, i.e., a selected network node location (Box 56). Processor unit 12 identifies a home street block 42 containing selected network node location 40 (Box 58) as well as street blocks adjacent to street block 42 (i.e., neighboring street blocks) and other street blocks. Processor unit 12 then assigns a priority value to each street block (Box 62).

As shown in FIG. 6, it is preferred that four types of priorities be established for street blocks with respect to selected network node location 40. In particular, a street block 42, containing selected network node location 40, is assigned a value of 1; a neighboring street block 44 which is directly across a street from the selected network node location is assigned a value of 2; other neighboring street blocks 46 are assigned a value of 3; and all other street blocks 48 are assigned a value of 4. Note that the above priority values are based on center line street data; however, any number of priority types and any priority values may be utilized in accordance with the present invention.

Thereafter, processor unit 12 (FIG. 7B) accesses Network Node List 30 and assigns a priority value to each selected network node location and subscriber location combination (i.e., a combination that contains selected network node location 40), according to the priority value of the street block containing the subscriber location (Box 64). For example, a selected network node location and subscriber location combination with a subscriber location situated on the same street block as selected network node location 40 is assigned a priority value of 1; a combination with a subscriber location located on a neighboring street block directly across the street from selected network node location 40 is assigned a priority value of 2; and so forth. The street crossing step is repeated for each network node location on Network Node List 30 (Box 66).

For each selected network node location, the selected network node location and subscriber location combinations are then sorted according to increasing priority values (i.e., lowest to highest) and Network Node List 30 is updated (Box 68). In the event that the selected network node location and subscriber location combinations have the same priority value, the network node location and subscriber location combinations are sorted by increasing distances.

Each subscriber location on Subscriber List 28 is next updated with the corresponding priority values from Network Node List 30 (Box 70). The network node location and subscriber location combinations for each subscriber location is likewise sorted first by increasing priority values and, if necessary, second by increasing distances and stored.

Next, Network Node List 30 is updated to include a maximum capacity constraint (hereinafter capacity constraint step). Processor unit 12 initially accesses Network Node List 30 and selects a network node location, i.e., a selected network node location (Box 72). Each selected network node location and subscriber location combination (FIG. 7C) is assigned a penalty value to its priority value based on the maximum capacity constraint (Box 74). That is to say, processor unit 12 counts the selected network node location and subscriber location combinations (already sorted by ascending priority values for the particular selected network node location), from the beginning of the list until the count equals the maximum capacity. All selected network node location and subscriber location combinations after the maximum capacity are penalized by adding a penalty value to their priority values. For instance, if the maximum capacity for the selected network node location is 20 and the penalty value is arbitrarily set to a large value, i.e., 100, a selected network node location and subscriber location combination having the 19th farthest distance is not penalized, but a combination having the 21st farthest distance is penalized by adding the penalty value of 100 to its priority value.

The capacity constraint step is repeated for each network node location on Network Node List 30 (Box 76). For each selected network node location, processor unit 12 then sorts its selected network node location and subscriber location combinations by increasing priority values and, if necessary, by distance values, and updates Network Node List 30 (Box 78).

Each subscriber location on the subscriber list is then updated with the adjusted priority values (i.e., penalty values) and, likewise, sorted according to priority values and distance values (Box 80).

It is important to understand that additional constraints may be easily incorporated into the present method by simply adjusting the priority values for each network node location and subscriber location combination of Network Node List 30 and Subscriber List 28. For instance, in cable television (CATV) networks, there is a desire to minimize the cable length and cost, while maintaining the quality of the transmitted signal. As the cable length increases, more costly cables are needed to maintain the same signal quality. Therefore, a maximum cable length constraint may be desirable when designing a CATV network. This can be easily accomplished by adjusting the priority value of those network node location and subscriber location combinations that exceed the maximum cable length (i.e., by adding some penalty value to their priority value, as in the capacity constraint step).

At this stage, processor unit 12 has generated all the information that is required to design a network in accordance with the invention. Note that while Network Node List 30 and Subscriber List 28 are generated during the operation of the invention, both lists can also be generated beforehand, using the constraint information and stored locally in data storage 20.

Thereafter, processor unit 12 compares alternative sets of network node locations and subscriber locations that are assigned to the network node locations, and determines an optimum set having a minimum number of crossings and a maximum capacity (hereinafter maximization/minimization step). It is preferred that each set is limited to a determined number (P) of network node locations.

Processor 12 randomly selects a set of network node locations having a determined number (P) of network node locations (i.e., $NN_1$ through $NN_P$) from all possible network node locations (Box 82). From Subscriber List 28, processor unit 12 then assigns each subscriber location to a network node location that has the lowest priority value out of all the network node locations in the set (Box 84). As each subscriber location on Subscriber List 28 already has pre-sorted by priority values the network node locations (in the form of network node location and subscriber location combinations), processor unit 12 need only select a subscriber location, scan the Subscriber List 28 until a network node location is identified that is contained in the set and has the lowest priority value with respect to the selected subscriber location, and then assign the selected subscriber location to the network node location. It is important to understand that each subscriber location is only assigned to a single network node location.

Processor unit 12 repeats this step for each subscriber location until each subscriber location on Subscriber List 28 has been assigned to a corresponding network node location in the set of network node locations. A total sum of priority values and total number of subscriber locations (FIG. 7D) is then calculated and stored for the selected set (Box 86).

Processor unit 12 next selects a network node location not contained in the above set (Box 90) and substitutes it for a first network node location (NN1) in the set, thereby forming a new set of network node locations (Box 92). As with the initial set, each subscriber location is again assigned to a network node contained in this new set according to priority values (Box 94), and the total sum of the priority values and the total number of subscriber locations (FIG. 7E) are calculated for this new set (Box 96). Processor unit 12 then compares the calculated values of the initial set to that of the new set and stores the set having the lower total priority value and the higher subscriber location number (i.e., stored for comparison with the results of the next set) (Box 98). The selected network node is then substituted for each network node location in the set (Box 100). The above process is then repeated for each network node location, not contained in the original selected set (Box 102).

Thereafter, processor unit 12 selects different sets of network node locations and repeats the maximization/minimization step for each selected set, until all possible combinations of network node locations with assigned subscriber locations have been compared (Box 104). After evaluating the total priority value and total number of subscriber locations for each possible combination of network node locations (i.e., each possible set of network nodes), a final set of network node locations with assigned subscriber locations is determined. This set is an estimate of the optimized locations of the selected network node locations and assigned subscriber locations.

It is important to understand that network design system 10 can be easily configured to design a network according to a single constraint, i.e., street crossing step, or a combination of constraints.

In summary, the present invention provides a method for minimizing street crossings and/or maximizing capacity in network design. The method further allows additional constraints, i.e., maximum cable length, to be easily incorporated in the network design.

The invention having thus described with particular reference to the preferred forms thereof, it will be obvious that various changes and modifications maybe made therein without departing from the spirit and scope of the invention as defined in the appended claims.

We claim:

1. A method of designing an integrated network, for a determined region, having a plurality of subscriber locations, possible network node locations and street blocks thereon, each subscriber location and network node location being located on a street block, said method comprising the steps of:

a) retrieving data corresponding to a plurality of network node locations, a plurality of subscriber locations and their associated street blocks and distance values between each network node location and each subscriber location;

b) eliminating each network node location and subscriber location combination having a distance value between a respective network node location and a respective subscriber location greater than a maximum distance value;

c) assigning to each network node location and subscriber location combination, other than those eliminated in step b, a priority value based on a proximity between a street block containing a respective network node location and a street block containing a respective subscriber location;

d) calculating a total sum of priority values assigned in step c) and a total number of subscriber locations, for each possible set of network node locations and subscriber locations; and e) determining said set of network node locations and subscriber locations having a minimum total sum of priority values and a maximum number of subscriber locations.

2. The method as recited in claim 1, wherein said each possible set of network node locations and subscriber locations contains a determined number of network node locations.

3. The method as recited in claim 1, wherein said distance values of said data are sorted by increasing order.

4. The method as recited in claim 1, wherein step e) includes the step of:
f) comparing said total sum of priority values and said total number of subscriber locations of each said set.

5. The method as recited in claim 1, wherein step c) includes the step of:
g) selecting a network node location;
h) assigning said priority value to each street block based on its proximity to a street block containing said network node location; and
i) assigning said priority value to each subscriber location in combination with said selected network node, according to said priority value of a street block containing said each subscriber location.

6. The method as recited in claim 1, wherein each network node location is capable of servicing a determined number of subscriber locations corresponding to a maximum capacity limit, said method comprising after step c the further steps of:
j) identifying, for each network node location, a limited set of subscriber locations that can be serviced without exceeding said maximum capacity limit, based on their priority values; and
k) adjusting said priority value of any network node location and subscriber location combination that is excluded from each limited set.

7. The method as recited in claim 6, wherein step k) adds a penalty value to priority values of each network node location and subscriber location combination that is excluded from said each limited set.

8. The method as recited in claim 6, wherein said step k) includes the further step of:
sorting network node location and subscriber location combinations according to their priority values in the increase order and then to said distance values in the increase order when said priority values are the same, for each network node location.

9. A method as recited in claim 1, wherein said step d) includes the steps of:
l) selecting one of said each possible set of network node locations;
m) assigning each subscriber location to a network node location contained in said selected set, based on said priority value;
n) calculating a total sum of priority values and a total number of subscriber locations for said selected set; and
o) selecting a different one of said each possible set of network node locations and repeating steps m and n.

10. A method of designing an integrated network, in a determined region, having a plurality of subscriber locations, possible network node locations thereon, each network node location being capable of servicing a maximum number of subscriber locations corresponding to a maximum capacity limit, said method comprising the steps of:
a) retrieving data corresponding to a plurality of network node locations, said plurality of subscriber locations and distance values associated with each network node location and subscriber location combination;
b) eliminating said each network node location and subscriber location combination having a distance value between a respective network node location and a respective subscriber location greater than a maximum distance value;
c) assigning to each network node location and subscriber location combination, other than those eliminated in step b, a priority value based on a maximum capacity limit and said distance value;
d) calculating a total sum of priority values assigned in step c) and a total number of subscriber locations, for each possible set of network node locations and subscriber locations; and
e) determining said set of network node locations and subscriber locations having a minimum total sum of priority values and a maximum number of subscriber locations.

11. A method as recited in claim 10, wherein said each possible set of network node locations and subscriber locations contains a determined number of network node locations.

12. A method as recited in claim 10, wherein step c) includes the step of:
f) identifying, for each network node location, a limited set of subscriber locations that can be serviced without exceeding said maximum capacity limit, based on a distance value;
g) adjusting said priority value of any network node location and subscriber location combination that is excluded from each limited set.

13. A method as recited in claim 12, wherein said step g) adds a penalty value to said priority value of each network node location and subscriber location combination that is excluded from said each limited set.

14. A method as recited in claim 10, wherein said data is sorted according to increasing distance values.

* * * * *